(12) United States Patent
Rathinasamy et al.

(10) Patent No.: US 12,432,206 B2
(45) Date of Patent: Sep. 30, 2025

(54) TIME VARYING INFORMATION ENCODING SCHEME FOR DEVICE SECURITY

(71) Applicant: Dell Products L.P., Round Rock, TX (US)

(72) Inventors: Shree Rathinasamy, Round Rock, TX (US); Padmanabhan Narayanan, Chennai (IN); Maxim Balin, Gan-Yavne (IL)

(73) Assignee: Dell Products L.P., Round Rock, TX (US)

( * ) Notice: Subject to any disclaimer, the term of this patent is extended or adjusted under 35 U.S.C. 154(b) by 243 days.

(21) Appl. No.: 18/482,314

(22) Filed: Oct. 6, 2023

(65) Prior Publication Data

US 2025/0119425 A1 Apr. 10, 2025

(51) Int. Cl.
*H04L 29/06* (2006.01)
*H04L 9/40* (2022.01)

(52) U.S. Cl.
CPC ...... *H04L 63/0876* (2013.01); *H04L 63/1466* (2013.01); *H04L 63/20* (2013.01)

(58) Field of Classification Search
CPC .. H04L 63/0876; H04L 63/1466; H04L 63/20
See application file for complete search history.

(56) References Cited

U.S. PATENT DOCUMENTS

2016/0359624 A1* 12/2016 Kim ..................... H04B 10/70
2020/0045033 A1* 2/2020 Flikkema ............ G06F 9/30145
2021/0152347 A1* 5/2021 Cambou ............... H04L 9/0858

* cited by examiner

Primary Examiner — Wasika Nipa
(74) Attorney, Agent, or Firm — WOMBLE BOND DICKINSON (US) LLP

(57) ABSTRACT

Methods and systems for managing operation of endpoint devices are disclosed. The operation of the endpoint devices may be managed by requiring that the endpoint devices obtain security data from other devices. If the security data is not obtained, the endpoint devices may seal at least some of their functions from use by users. By limiting the functions of the endpoint devices, malicious parties may be less likely to be able to compromise the endpoint devices. The endpoint devices and other devices may be operably connected via a channel that limits that distance between the endpoint devices and the other devices. If the distance is exceeded, then the endpoint devices may be deprived of access to the security data.

20 Claims, 6 Drawing Sheets

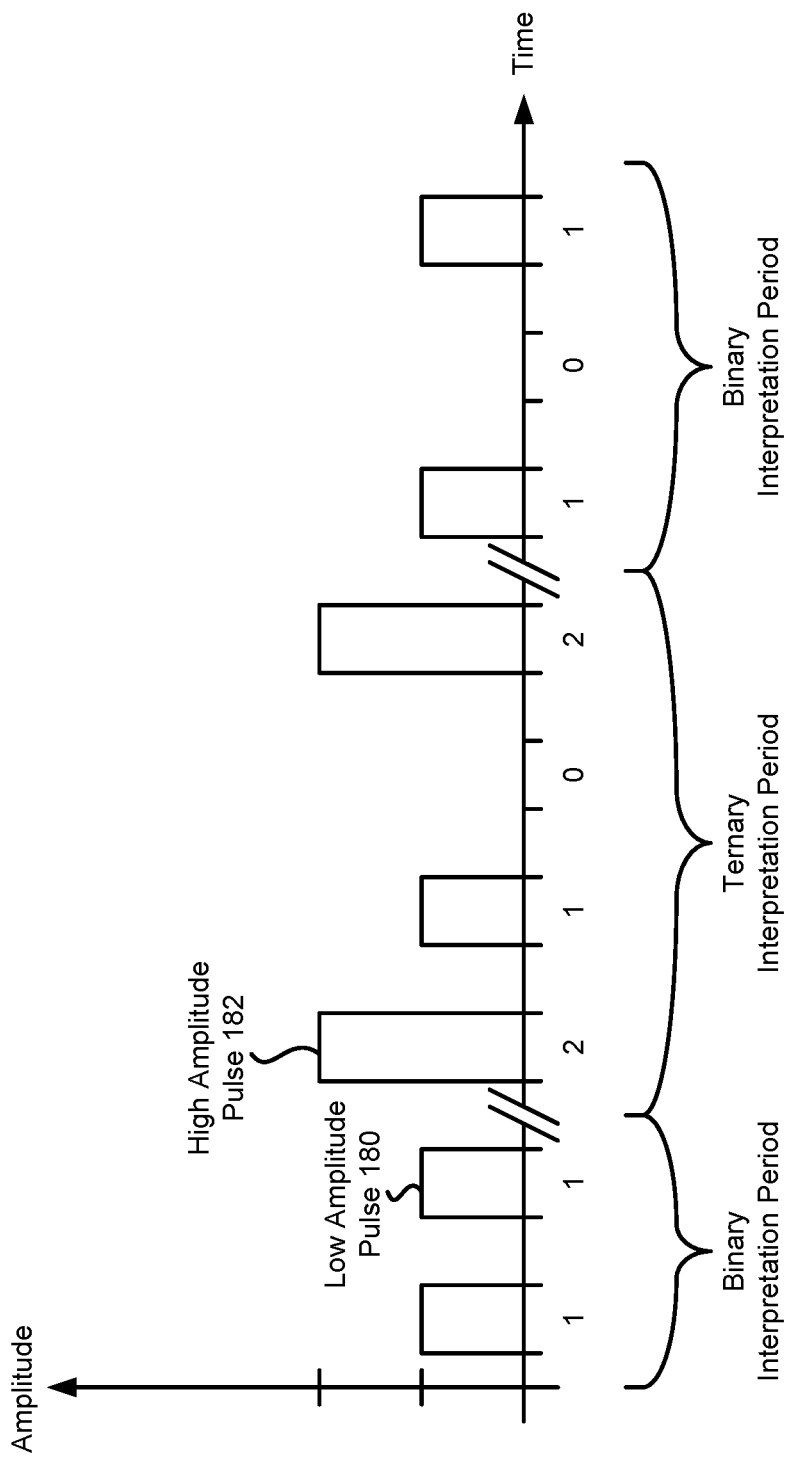

TIME VARYING INFORMATION ENCODING SCHEME FOR DEVICE SECURITY

FIELD

Embodiments disclosed herein relate generally to device management. More particularly, embodiments disclosed herein relate to systems and methods to secure devices.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIG. 1C shows a block diagram illustrating example of encoding of information in accordance with an embodiment.

DETAILED DESCRIPTION

Figure 1A:
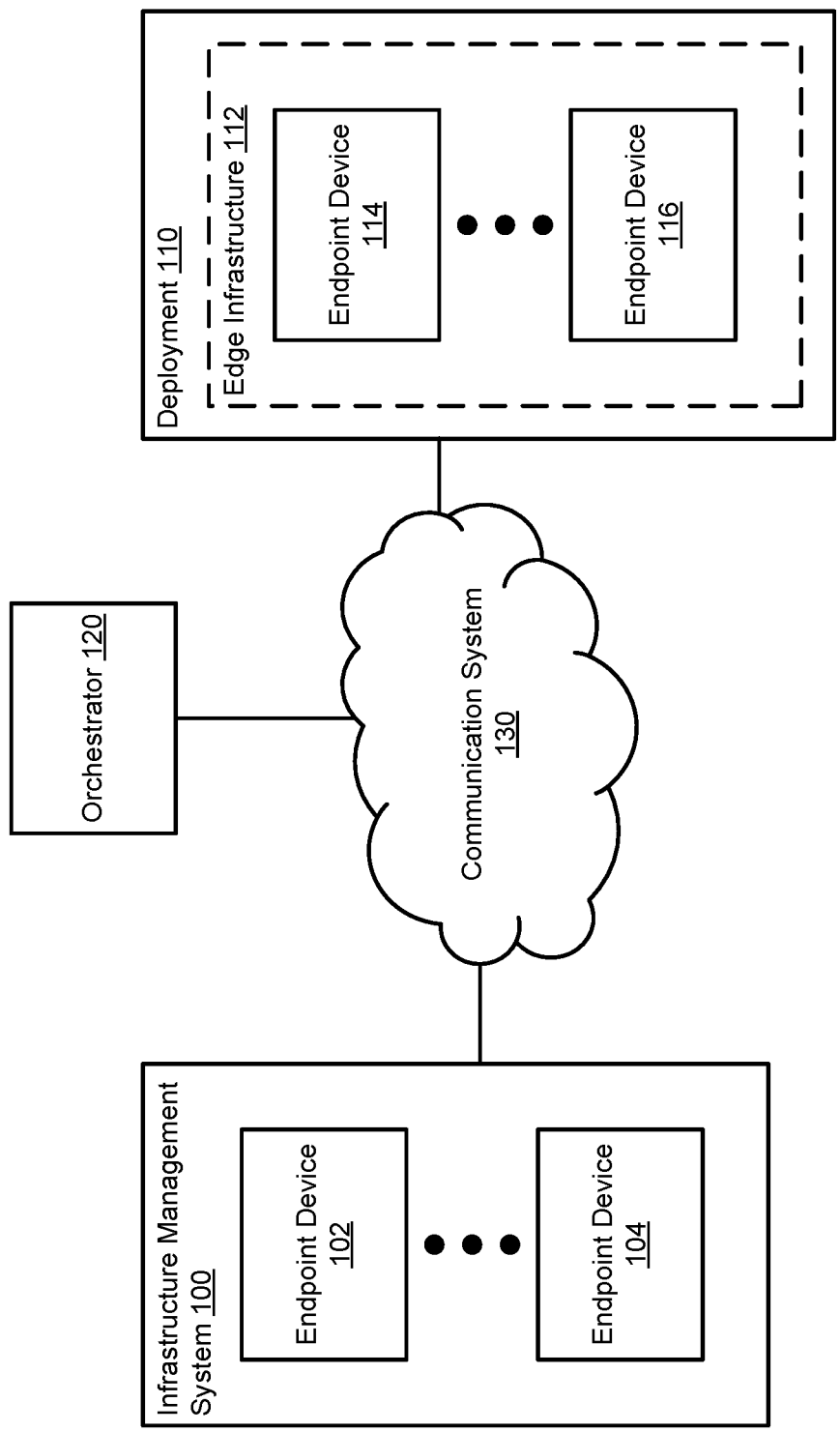
FIG. 1A shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for providing services using endpoint devices. To provide services using endpoint devices, the endpoint devices may host various pieces of software, may be configured in certain manners, and/or may be adapted to provide the computer implemented services in various ways.

During operation, the endpoint devices may transmit data to one another using optical carriers transmitted in free space. These optical carriers may be read by receiving devices and other devices in the area. Consequently, malicious entities may attempt to intercept such communication and/or inject malicious communications to attempt to compromise the endpoint devices and/or data transmitted between the endpoint devices and/or other devices.

To reduce the likelihood of compromise of the endpoint devices due to such and/or other threats, the end point devices may implement a security framework that requires that different encoding scheme be used to encode data on optical carriers. The encoding schemes may be used to encode different types of data.

By doing so, even if optical carriers are intercepted by malicious devices and/or if malicious communications are transmitted to the endpoint devices, the likelihood of compromises occurring may be reduced by the use of the multiple encoding schemes. Because malicious entities are unlikely to know of the used encoding schemes, the malicious entities may be unlikely to utilizing the encoding schemes in a manner that allows them to successfully interpret communications and/or spoof communications.

Thus, embodiments disclosed herein may address, among others, the technical problem of security in a distributed system. By implementing varying encoding schemes, communications between endpoint devices of the distributed system may be less likely to be compromised.

In an embodiment, a method for managing devices of a deployment are provided. The method may include providing, by a first device of the devices, a challenge to a second device of the devices; obtaining, by the first device and via an optical channel, an encoded response to the challenge via an optical pulse train; interpreting, by the first device, the optical pulse train using an ternary encoding system to obtain an interpreted response; attempting, by the first device, to authenticate the interpreted response; and in a first instance of the attempting where the interpreted response is authenticated: establishing, by the first device, secure communications with the second device using the optical channel and a binary encoding system.

The method may also include, after sending the challenge and prior to obtaining the encoded response: obtaining, by the first device and from the second device and via the optical channel, a first notification indicating switching from the binary encoding system to the ternary encoding system; and providing, by the first device and to the second device and via the optical channel, a first acknowledgement to the first notification.

The method may also include, in the first instance of the attempting and prior to establishing the secure communications: providing, by the first device and to the second device and via the optical channel, a second notification indicating switching from the ternary encoding system to the binary encoding system; and obtaining, by the first device and from the second device and via the optical channel, a second acknowledgement to the second notification.

The first notification and the first acknowledgement may be carried over the optical channel using first optical pulse trains encoded with the binary encoding system, and the second notification and the second acknowledgement may be carried over the optical channel using second optical pulse trains encoded with the ternary encoding system.

The ternary encoding system may define a number system with three members and the binary encoding system defines a number system with two members.

The optical pulse train may include pulses of three magnitudes corresponding to respective members of the three members.

The secure communications may be carried via the optical channel using optical pulse trains including pulses of two magnitudes corresponding to respective members of the two members.

The method may also include in a second instance of the attempting where the interpreted response is not authenticated: denying, by the first device, secure communications with the second device.

The method may also include in the first instance of the attempting where the interpreted response is authenticated: distributing, by the first device and to the second device, configuration information via the secure communications.

The method may also include in the first instance of the attempting where the interpreted response is authenticated: obtaining, by the first device and from the second device, synchronization data from the second device; and updating operation of the first device using the synchronization data.

Updating operation of the first device may include identifying, using the synchronization data, a condition of the second device; and performing, based on the condition, at least one action selected from a group of actions consisting of: modifying a security posture of the first device; installing a new piece of software to the first device;

disabling an existing piece of software hosted by the first device; and modifying a configuration of the first device to manage a threat to the first device.

The first device may be an orchestrator and the second device may be an edge device.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may initiate performance the computer-implemented method when the computer instructions are executed by the processor.

Turning to FIG. 1A, a block diagram illustrating a system in accordance with an embodiment is shown. The system shown in FIG. 1A may provide computer-implemented services. The computer implemented services may include any type and quantity of computer implemented services. For example, the computer implemented services may include data storage services, instant messaging services, database services, transaction processing services, and/or any other type of service that may be implemented with a computing device.

To provide the computer implemented services, the system may include deployment 110. Deployment 110 may edge infrastructure 112 which may include any number of endpoint devices (e.g., 114, 116). The endpoint devices may cooperatively and/or individually provide all, or a portion of the computer implemented services.

To contribute to the computer implemented services, the endpoint devices may host certain software, may be configured in certain manners (e.g., network communication configurations, software/hardware configurations, etc.), and/or may otherwise be modified to meet one or more requirements to contribute to the computer implemented services. Further, groups of endpoint devices may be modified to cooperatively provide various services. For example, some endpoint devices of a group may host some software to provide some functions while other endpoint devices of a group may host different software to provide other functions which, in aggregate, allow desired computer implemented services to be provided.

However, due to the placement of endpoint devices (e.g., at an edge installation) and the resources of the endpoint devices, the endpoint devices may be more susceptible to malicious activity. For example, any of the endpoint devices may be part of edge infrastructure (e.g., 112) which may subject the endpoint devices to physical attacks (e.g., malicious devices may be operably connected to the endpoint devices by attaching the malicious device to a port of a network interconnecting the endpoint devices), network attacks (e.g., networks that support operation of the edge installation may include fewer security mechanisms than would be present in other computing environments such as data centers), and/or the endpoint devices may be subject to more vectors of attack for other reason when compared to computing devices located in other computing environments.

In general, embodiments disclosed herein may provide methods, systems, and/or devices for managing the operation of infrastructure. To manage the infrastructure, a security framework for edge devices (and/or other types of devices) of the infrastructure may be enforced. The security framework may require multiple types of encoding scheme be utilized when sending and receiving different types of information.

For example, the security framework may require that general data transmissions over uncontained optical channels (e.g., such as LiFi or other free space optical communication protocols) be encoded using a first encoding scheme on an optical carrier, and other types of data transmissions (e.g., challenge responses, challenges, other types of security information) be encoded using a second encoding scheme on the optical carrier. Thus, different types of information may be encoded differently.

By doing so, embodiments disclosed herein may improve the security of distributed systems by reducing the likelihood of members of the system and/or data transmitted between the members of the system from being compromised. The system may do so by dynamically switching between encoding schemes used in optical communications between the endpoint devices. Similarly security frameworks may be applied to communications between endpoint devices and management systems such as, for example, orchestrators, servers, etc. Thus, even if a malicious attacker is able to read free space optical communications, the malicious attacker may be less likely to successfully interpret the communications by virtue of the different types of encoding schemes utilized by the system.

To provide the above noted functionality, the system of FIG. 1A may include infrastructure management system 100, deployment 110, orchestrator 120, and communication system 130. Each of these components is discussed below.

Infrastructure management system 100 may facilitate management of deployment 110. Infrastructure management system 100 may include any number of endpoint devices (e.g., 102, 104). The endpoint devices may be used by administrators and/or other persons that manage deployment 110 to provide desired computer implemented services.

Orchestrator 120 may manage deployment 110. To manage deployment 110, orchestrator 120 may present interfaces to users of data processing systems 102-104 of infrastructure management system 100. The interfaces may allow privileged users (e.g., administrators, etc.) to enforce security frameworks by, for example, deploying security data that define when and how different encoding schemes are to be used by endpoint devices of deployment 110.

Deployment 110, as noted above, may provide computer implemented services. To provide the computer implemented services, the endpoint devices of deployment 110 may implement the security framework discussed above.

Figure 1B:
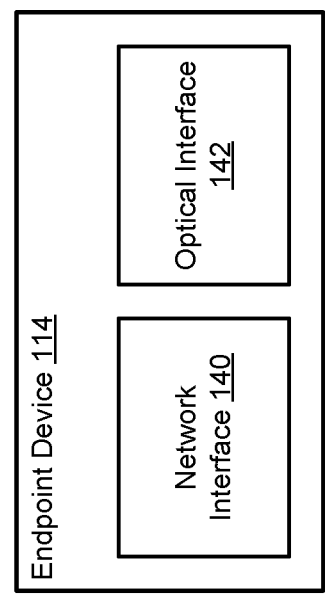
FIG. 1B shows a block diagram illustrating an endpoint device of a system in accordance with an embodiment.

The security framework may require that each endpoint device (i) authentic itself to other devices and authenticate other devices prior to interacting with the other devices, (ii) when communicating with other devices, utilize different types of encoding schemes for optical communications depending on the type of data to be communicated, and/or (iii) perform other actions to reduce the likelihood of compromises (e.g., malicious entities gaining access to data, gaining control over endpoint devices, etc.) from occurring. To facilitate communications between endpoint devices and other devices, each endpoint device may include communication interfaces. At least one communication interface may be a free space optical communication interface. Refer to FIG. 1B for additional details regarding free space optical communication interfaces.

Figure 2:
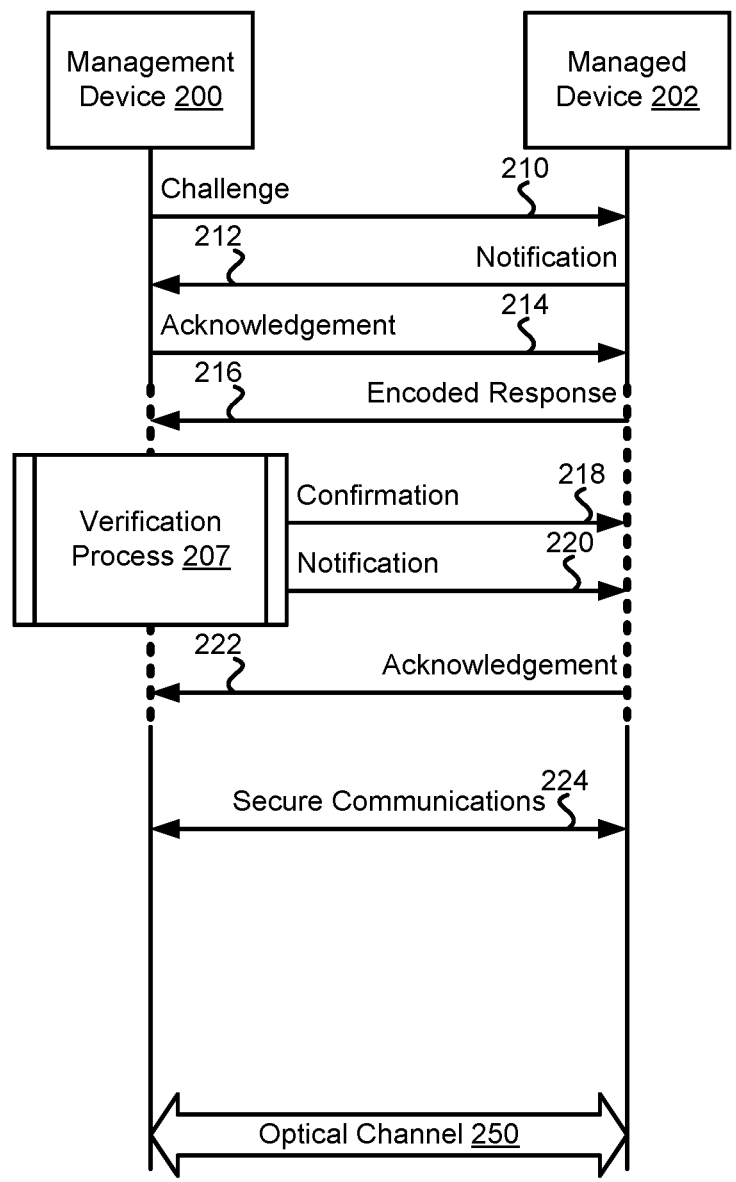
FIG. 2 shows an interaction diagram in accordance with an embodiment.
Figure 3:
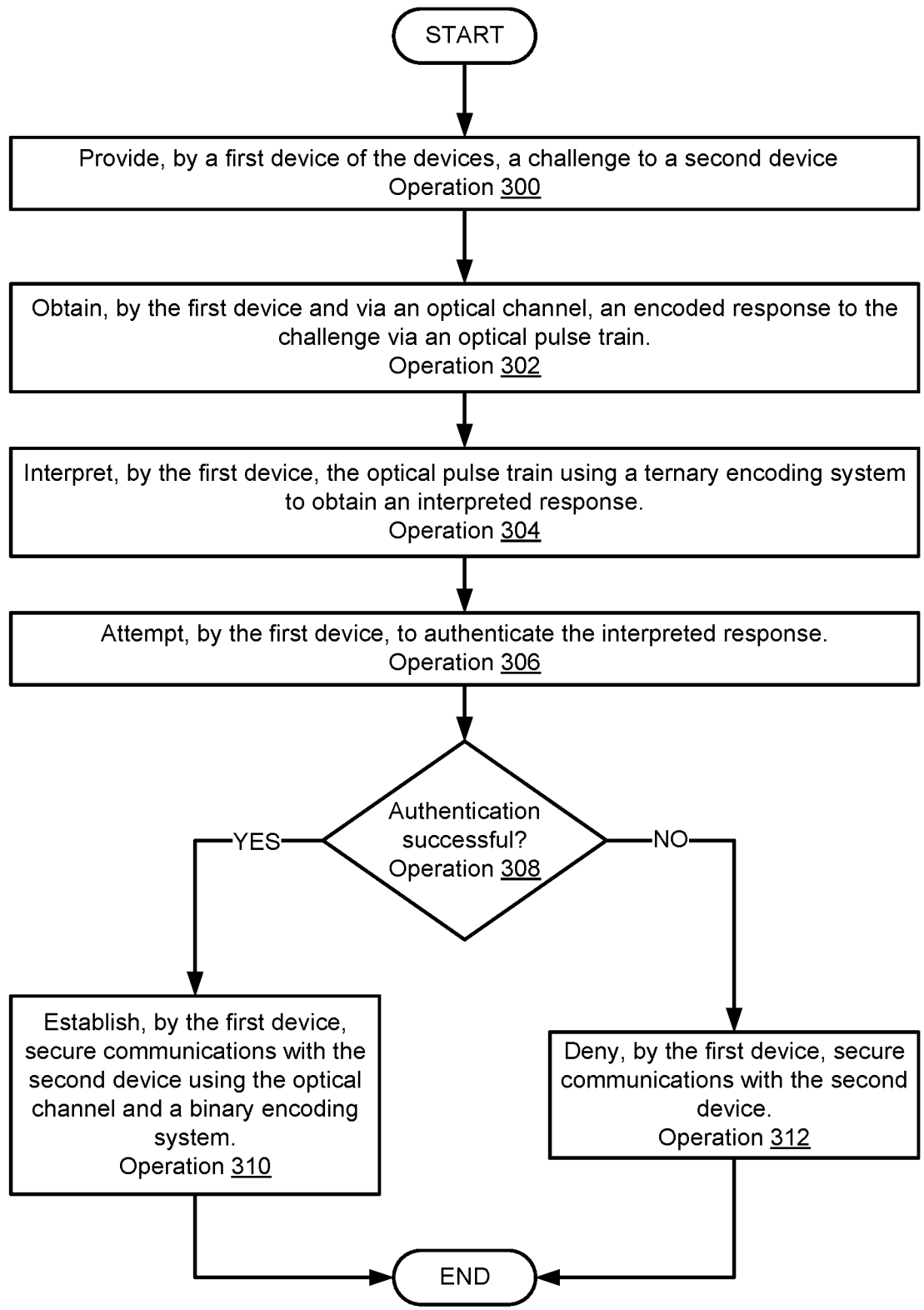
FIG. 3 shows a flow diagram illustrating a method in accordance with an embodiment.

When providing their functionality, any of (and/or components thereof) infrastructure management system 100, deployment 110, and/or orchestrator 120 may perform all, or a portion, of the actions and methods illustrated in FIGS. 2-3.

Any of (and/or components thereof) infrastructure management system 100, deployment 110, and orchestrator 120 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1A may be operably connected to each other (and/or components not illustrated) with communication system 130. In an embodiment, communication system 130 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1A as including a limited number of specific components, a system in accordance with an embodiment may include fewer, additional, and/or different components than those illustrated therein.

As noted above, to facilitate communications with other devices, free space optical communications may be utilized. Turning to FIG. 1B, a diagram of endpoint device 114 in accordance with an embodiment is shown. Any of endpoint devices 114-116 may be similar to endpoint device 114.

As discussed above, endpoint device 114 may provide computer implemented services. To provide the computer implemented services, endpoint device 114 may communicate with other devices, such as other endpoint devices, orchestrators, etc.

To communicate with other devices, endpoint device 114 may include network interface 140 and optical interface 142. Network interface 140 may facilitate network communications with other devices (e.g., via communication system 130). Network interface 140 may be implemented with a network interface card or other devices that facilitates wired and/or wireless (e.g., using radio frequency and/or higher frequency bands up to 100 gigahertz) network communications.

Like network interface 140, optical interface 142 may also facilitate communications with other devices. However, optical interface 142 may utilize optical transmission mediums (e.g., free space) and optical signals to exchange information with other devices. Optical interface 142 may include an optical transceiver or other type of system for generating optical signals and interpreting received optical signals. For example, the optical transceiver may generate modulated optical signals to carry data, and may facilitate interpretation of received optical signals to receive data.

In an embodiment, the optical transceiver includes functionality to generate optical signals of light of time varying magnitude. For example, the optical transceiver may generate at least three different intensities of light. To encode data onto the light, different intensities of light may be generated, depending on the encoding scheme utilized to encode data onto the optical carrier wave. Refer to FIG. 1C for additional details regarding encoding of data on to the optical carrier wave.

To reduce the likelihood of the data transmitted via the optical carrier being compromised, the security framework may require that different encoding schemes be utilized for different types of data. Refer to FIG. 1C for additional details regarding encoding schemes. Refer to FIG. 2 for additional details regarding use of different encoding schemes. By doing so, embodiments disclosed herein may improve the security of communications across a distributed system.

Turning to FIG. 1C, a plot illustrating an example of data encoded on an optical carrier over time in accordance with an embodiment is shown. In FIG. 1C, time increases from left to right across the plot, and a magnitude of intensity of the optical carrier signal increases from bottom to top of the plot.

To facilitate encoding of data using multiple encoding schemes, the optical transceivers of the endpoint devices may include functionality to generate different discrete intensities of light. For example, the optical transceivers may include functionality to (i) not generate light (e.g., a lowest intensity), (ii) generate some light (e.g., a moderate intensity), and (iii) generate a larger amount of light (e.g., a highest intensity).

To encode data on the optical carrier, the amplitude of the optical carrier may be varied over time in accordance with an encoding scheme used during different periods of time. The encoding schemes may include a binary encoding scheme and a ternary encoding scheme.

The binary encoding scheme may require that values of "0" be represented with a first intensity of light and values of "1" be represented with a second intensity of light. For simplicity, in FIG. 1C, encodings of "0" are assigned to periods of time when no light is generated and encodings of "1" are assigned to periods of time (e.g., the first two pulses from left to right) when moderate amounts of light are generated.

The ternary encoding scheme may require that values of "0" be represented with a first intensity of light, values of "1" be represented with a second intensity of light, and values of "2" be represented with a third intensity of light. For simplicity, in FIG. 1C, encodings of "0" are assigned to periods of time when no light is generated and encodings of "1" are assigned to periods of time (e.g., the first two pulses from left to right) when moderate amounts of light are generated, and encodings of "2" are assigned to periods of time (e.g., the third and fifth pulse from left to right) when large amounts of light are generated.

To interpret the light (e.g., when received by an optical transceiver), the receiver may utilize the corresponding encoding scheme. Because different encodings schemes are used, the corresponding encoding scheme may be utilized to interpret each set of received optical signals.

For example, consider an example scenario where a sender encodes two bits of data using a binary encoding scheme, then after a first period of time (e.g., indicated by the first break in the line from left to right indicating time) switches to a ternary encoding scheme and encodes four bits of data, and then after a second period of time (e.g., indicated by the second break in the line from left to right indicating time) switches back to the binary encoding scheme and encodes three bits of data. To interpret the aforementioned data, the receiver may use the corresponding encoding scheme, thereby retrieving values of 1, 1 for the first two bits, values of 2, 1, 0, 2 for the next four bits, and values of 1, 0, 1 for the last three bits.

However, if a malicious entity does not have knowledge of when different encoding schemes are utilized, the malicious entity may misinterpret ternary encoded data as indicating binary values of 1, 1, 0, 1 (e.g., rather than 2, 1, 0, 2 as intended by the sender). Thus, by dynamically switching between encoding schemes based on the type of data being transmitted, data transmission by a distributed system may be less likely to be compromised even if measurements of the carrier signal are taken and interpreted by a malicious entities.

For example, in an edge deployment where limited physical protections are in place for endpoint devices, a malicious person may deploy a measurement tool to read optical carrier signals over which data is transmitted. However, use of the encoding signals may reduce the likelihood of the malicious person properly interpreting the optical carrier signal to read the transmitted data.

In another example, a malicious person may attempt to deploy a malicious device which may attempt to communicate with endpoint devices via free space optical transmissions. However, by virtue of the use of multiple encoding schemes, the free space optical transmissions may be less likely to successfully trick endpoint devices into communicating with the malicious device. For example, the malicious device may not be aware of how to encode data in accordance with the encoding schemes utilized by the distributed system (e.g., may interpret the optical transmissions merely being on-off coded rather than being amplitude modulated).

While shown in FIG. 1C as being pulses of optical light that are separated in time from other pulses for clarity, it will be appreciated that the width of the "pulses" may be continuous (e.g., directly connected to one another so that the light intensity merely changes to correspond to each value rather than reverting to a base intensity of 0).

Additionally, to establish an optical channel, various calibration procedures may be performed to ensure that different intensities of light are able to be generated and received by the optical transceivers. Any calibration procedure may be utilized, and various calibrations may be performed over time (e.g., as environmental conditions change) to ensure accurate reading of the optical carrier.

Any light spectrum may be utilized without departing from embodiments disclosed herein.

To further clarify embodiments disclosed herein, an interaction diagram in accordance with an embodiment is shown in FIG. 3. The interaction diagram may illustrate secure communications between two devices may be established.

In the interaction diagrams, processes performed by and interactions between components of a system in accordance with an embodiment are shown. In the diagrams, components of the system are illustrated using a first set of shapes (e.g., 200, 202, etc.), located towards the top of each figure. Lines descend from these shapes. Processes performed by the components of the system are illustrated using a second set of shapes (e.g., 217, etc.) superimposed over these lines. Interactions (e.g., communication, data transmissions, etc.) between the components of the system are illustrated using a third set of shapes (e.g., 210, 212, etc.) that extend between the lines. The third set of shapes may include lines terminating in one or two arrows. Lines terminating in a single arrow may indicate that one way interactions (e.g., data transmission from a first component to a second component) occur, while lines terminating in two arrows may indicate that multi-way interactions (e.g., data transmission between two components) occur.

Generally, the processes and interactions are temporally ordered in an example order, with time increasing from the top to the bottom of each page. For example, the interaction labeled as 210 may occur prior to the interaction labeled as 212. However, it will be appreciated that the processes and interactions may be performed in different orders, any may be omitted, and other processes and/or interactions may be performed without departing from embodiments disclosed herein.

Turning to FIG. 2, a first interaction diagram in accordance with an embodiment is shown. The first interaction diagram may illustrate processes and interactions that may occur to secure endpoint devices of a deployment.

To secure the devices, any of the components of FIG. 1A may operate as a management device (e.g., 200) and any of the components may operate as a managed device (e.g., 202). A management device may be a device that tries to initiate secure communications with another device via optical channel 250 (e.g., free space over which optical carriers may be transmitted). A managed device may be device with which another device may initiate the secure communications. The management device may initiate secure communications to provide data, to obtain data, and/or for other purposes.

For example, an orchestrator may attempt to initiate secure communications with an endpoint device of an edge deployment to securely obtain data and/or provide instructions to the endpoint device.

To initiate secure communications with another device, management device 200, at interaction 210, sends a challenge to managed device 202. The challenge may include a nonce or other data and may indicate that managed device 202 is to provide a response to the challenge to authenticate managed device 202 to management device 200. The challenge may be selected in accordance with a pre-agreed upon challenge/response authentication protocol. The challenge/response authentication protocol may include use of a pre-shared secret (e.g., a pre-shared key and/or use dynamically generated secrets. The challenge/response authentication protocol may include use of multi-factor authentication, one-time-passwords, and/or other cryptographic approaches.

The challenge may be transmitted to managed device 202 via optical channel 250 using a first encoding scheme. The first encoding scheme may be a binary encoding scheme utilized to encode general data transmitted between components of a distributed system. In FIG. 2, the lines descending from management device 200 and managed device 202 are drawn partially in dashing and partially in solid. The solid portions of the lines indicate that during these periods of time the binary encoding scheme is used to encode data transmitted between these devices. The dashed portions of the lines indicate that during these other periods of time the ternary encoding scheme is used to encode data transmitted between these devices via optical channel 250.

When managed device 202 obtains the challenge, manage device 202 may identify that a response is to be provided to the challenge. Based on the identification, managed device 202 may determine that the response is security data which a security framework requires be encoded using a second encoding scheme when transmitted over optical channel 250. To facilitate use of the second encoding scheme, at interaction 212, managed device 202 may send a first notification to management device 200 via the optical channel. Management device 200 may, at interaction 214 and in response to the first notification, send a first acknowledgement of the first notification.

Once sent and when received by managed device 202, both management device 200 and managed device 202 may switch to the ternary encoding scheme for data transmitted via optical channel 250.

Once switched to the ternary encoding scheme, managed device 202 may generate and send, at interaction 216, an encoded response to management device 200. Encoded response may be transmitted via an optical carrier with data encoded on it using the ternary encoding scheme.

When received by management device 200, the ternary encoded scheme may be used to interpret the carrier to read the response. For example, values of 0, 1, and 2 may be read from the carrier wave.

The response (prior to encoding) may be a signed copy of the challenge (and/or may include other type of cryptographic information, discussed above). The signature may be applied using a secret maintained by managed device 202, and the signature may be verified by management device 200 using another secret (e.g., or a copy of the used secret is a symmetric key is used).

When received by management device 200, verification process 207 may be used. Any type of verification algorithm may be used. For example, if the response is a copy of the challenge signed with a private key, a public key corresponding to the private key and a signature verification algorithm may be used to verify (i) the payload, and (ii) authenticate managed device 202 (e.g., using trusted public keys). It will be appreciated that other verification processes may be used depending on the type of encoded response.

If successfully validated, at interactions 218 and 220, management device 200 may send a confirmation of success of the authentication and a second notification indicating to switch back to the binary encoding scheme.

Like the encoded response, managed device 202 may interpret the carrier wave carrying the confirmation and notification using the ternary encoding scheme to obtain the confirmation and response. In response to the notification, at interaction 222, managed device 202 may send a second acknowledgement to management device 200 acknowledging the switch to the binary encoding scheme.

Consequently, both management device 200 and managed device 202 may revert to use of the binary encoding scheme for transmission of data via optical channel 250.

Once reverted, at interaction 224, management device 200 and managed device 202 may initiate secure communications with one another (e.g., by sending encrypted communications via optical channel 250.

For example, once authenticated, these devices may synchronize various data with each other. The data may include information regarding the environment in which the devices reside, threats to the devices identified by the other devices, etc.

When the data is synchronized, any of these devices may use the data to identify desirable changes in the operation. For example, the changes may improve the security of the devices.

The actions may include, for example, any of modifying a security posture of the device (e.g., closing ports, implementing communication filtering rules, etc.); installing a new piece of software to the device (e.g., antivirus, malware detection, application software to offload work from other devices to the device, etc.); disabling an existing piece of software hosted by the device (e.g., software identified as being malicious using the synchronized data); modifying a configuration of the device (e.g., software/hardware configuration, may improve performance, power efficiency, reduce security risks, etc.); and/or other types of actions that may improve the operation of the device based on information obtained by other devices.

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

As discussed above, the components of FIG. 1A may perform various methods to manage operation of endpoint devices through validation of roots of trust. FIG. 3 illustrates a method that may be performed by the components of the system of FIG. 1A. In the diagram discussed below and shown in FIG. 3, any of the operations may be repeated, performed in different orders, and/or performed in parallel with or in a partially overlapping in time manner with other operations.

At operation 300, a challenge is provided by a first device to a second device. The challenge may any type of cryptographic challenge (e.g., requests a cryptographically verifiable response). The challenge may be provided by encoding using a first encoding scheme (e.g., binary) and sending the encoded challenge to the second device via an optical channel (e.g., free space).

The first device may be, for example, a server, an orchestrator, an endpoint device, or any other type of management device. The second device may be a server, an orchestrator, an endpoint device, or any other type of managed device. For example, the second device may be an edge device of a deployment and the second device may be an orchestrator.

At operation 302, an encoded response to the challenge is received by the first device and from the second device via an optical channel. The response may be encoded on an optical pulse train transmitted by the second device to the first device via the optical channel. The response may be obtained by receiving the optical pulse train via the optical channel. Once obtained, the optical pulse train may be interpreted in accordance with a second encoding scheme (e.g., ternary).

Prior to obtaining the encoded response via the optical pulse train, the second device may send a notification the first change indicating the change to the second encoding scheme, and the first device may acknowledge the change back to the second device. Consequently, the first device may know to use the second encoding scheme to interpret the optical pulse train.

The optical pulse train may be received by a transceiver of the first device which may interpret light received via free space.

At operation 304, the optical pulse train is interpreted using a ternary encoding system to obtain an interpreted response. The optical pulse train may be interpreted by identifying corresponding values for each pulse using the ternary encoding system. The ternary encoding system may assign different values to pulses of different magnitude. As noted above, the first device may have notified that the pulse train was going to encode data using the ternary encoding system.

At operation 306, an attempt is made to authenticate the interpreted response (e.g., some amount of ternary data in which the response is stored) by the first device. The attempt may be made by using any quantity and type of cryptographic data and verification algorithms (e.g., signature checking) to verify (i) the integrity of a payload of the response, and (ii) trust in the signer. If successfully authenticated, then the second device may be trusted by the first device and treated as being authentic. If unsuccessfully authenticated, then the second device may not be trusted by the first device (e.g., at least until successfully authenticated).

To perform the authentication, the ternary representation of the response may be converted to a binary or other type of response to improve compatibility with various verification algorithms, cryptographic data (e.g., keys), etc.

At operation 308, a determination is made regarding whether the authentication of the of the interpreted response is successful. If successful, then then method may proceed to operation 310. Otherwise the method may proceed to operation 312.

At operation 310, secure communications are established by the first device with the second device using the optical channel and a binary encoding system. The secure communication may be established, for example, by generating a session key cooperatively with the second device. To do so, various communications between the first and second device may be made by encoding data onto optical carriers using the binary encoding scheme. Once established, the session key (e.g., a symmetric encryption/decryption key) may be used to encrypt data transmitted between the devices via the optical channel between them.

Prior to operation 310, the first device may notify the second device that the second device has been successfully authenticate, and to switch to the binary encoding scheme. The second device may acknowledge the notification and both device may switch to the binary encoding scheme for general data transmission. Thus, via operations 300-310, different types of data (e.g., general versus authentication) may be encoded using different encoding scheme thereby improving the security of authentication and data transmission between the devices.

Once the secure communications are established, various types of data may be exchanged via the optical channel using the binary encoding system. The synchronized data may prompt changes to operation of either of the devices.

The method may end following operation 310.

Returning to operation 308, the method may proceed to operation 312 following operation 308 when the authentication is not successful.

At operation 312, secure communication with the second device are denied by the first device. The secure communications may be denied, for example, by terminating the interaction, sending a notification indicating that communications are denied, and/or via other methods.

The method may end following operation 312.

Thus, using the method shown in FIG. 3, embodiments disclosed herein may reduce the likelihood of endpoint devices from being compromised and data transmitted between endpoint devices and other devices from being compromised.

Figure 4:
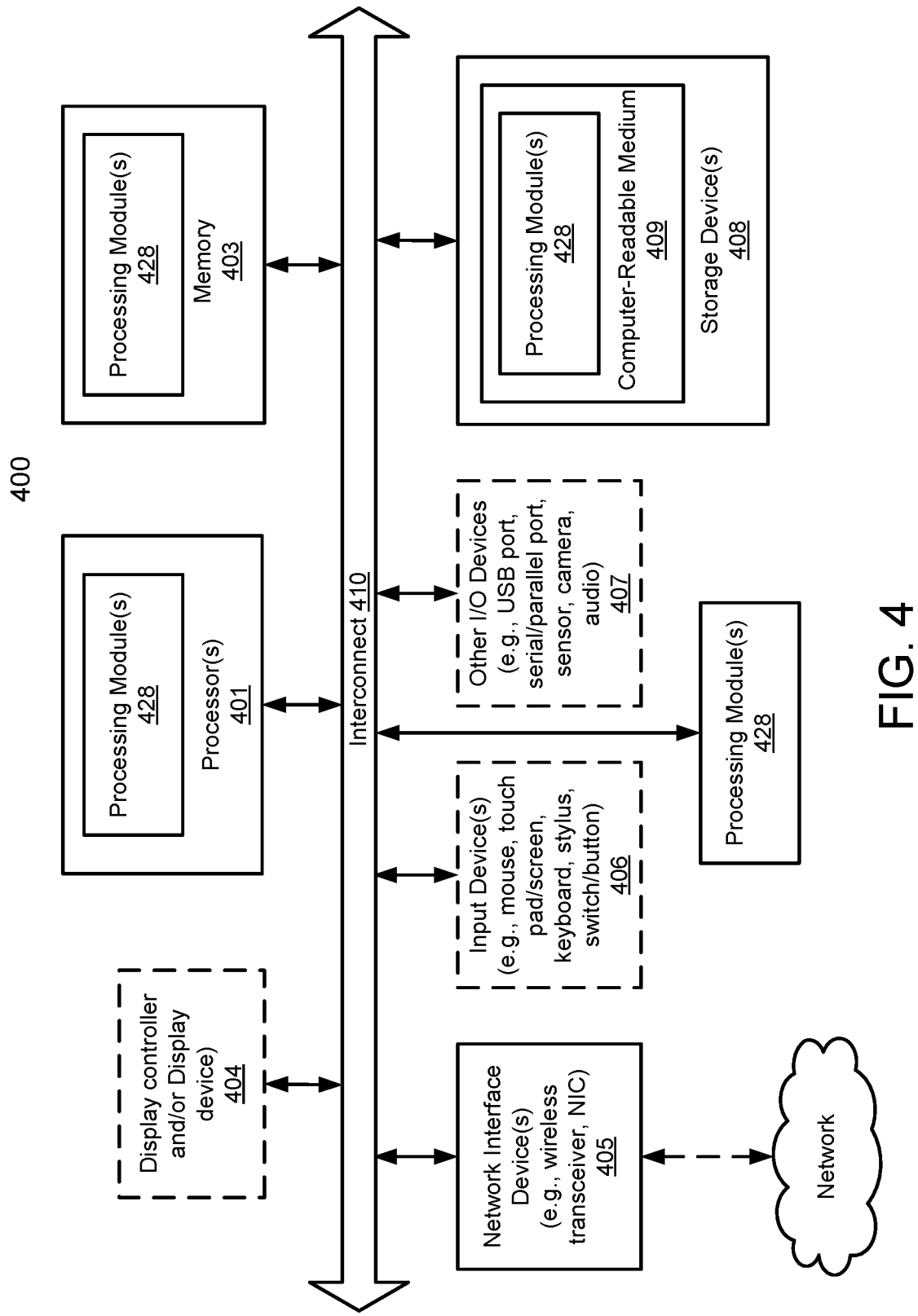
FIG. 4 shows a block diagram illustrating a data processing system in accordance with an embodiment.

Any of the components illustrated in FIGS. 1A-2 may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing devices of a deployment, the method comprising:
    providing, by a first device of the devices, a challenge to a second device of the devices;
    obtaining, by the first device and via an optical channel, an encoded response to the challenge via an optical pulse train;
    interpreting, by the first device, the optical pulse train using a ternary encoding system to obtain an interpreted response, the ternary encoding system defines a number system with three members and the optical pulse train comprises pulses of three magnitudes corresponding to respective members of the three members;
    attempting, by the first device, to authenticate the interpreted response; and
    in a first instance of the attempting where the interpreted response is authenticated:
        establishing, by the first device, secure communications with the second device using the optical channel and a binary encoding system, wherein, prior to establishing the secure communications, the first device and the second device switch between communicating using first optical pulse trains encoded with the binary encoding system and second optical pulse trains encoded with the ternary encoding system on the optical channel.

2. The method of claim 1, further comprising:
    after sending the challenge and prior to obtaining the encoded response:
        obtaining, by the first device and from the second device and via the optical channel, a first notification indicating switching from the binary encoding system to the ternary encoding system; and
        providing, by the first device and to the second device and via the optical channel, a first acknowledgement to the first notification.

3. The method of claim 2, further comprising:
    in the first instance of the attempting and prior to establishing the secure communications:
        providing, by the first device and to the second device and via the optical channel, a second notification indicating switching from the ternary encoding system to the binary encoding system; and obtaining, by the first device and from the second device and via the optical channel, a second acknowledgement to the second notification.

4. The method of claim 3, wherein the first notification and the first acknowledgement are carried over the optical channel using the first optical pulse trains encoded with the binary encoding system, and the second notification and the second acknowledgement are carried over the optical channel using the second optical pulse trains encoded with the ternary encoding system.

5. The method of claim 1, wherein the binary encoding system defines a number system with two members.

6. The method of claim 5, wherein the secure communications are carried via the optical channel using optical pulse trains comprising pulses of two magnitudes corresponding to respective members of the two members.

7. The method of claim 1, further comprising:
in a second instance of the attempting where the interpreted response is not authenticated:
denying, by the first device, secure communications with the second device.

8. The method of claim 1, further comprising:
in the first instance of the attempting where the interpreted response is authenticated:
distributing, by the first device and to the second device, configuration information via the secure communications.

9. The method of claim 1, further comprising:
in the first instance of the attempting where the interpreted response is authenticated:
obtaining, by the first device and from the second device, synchronization data from the second device; and
updating operation of the first device using the synchronization data.

10. The method of claim 9, wherein updating operation of the first device comprises:
identifying, using the synchronization data, a condition of the second device; and
performing, based on the condition, at least one action selected from a group of actions consisting of:
modifying a security posture of the first device;
installing a new piece of software to the first device;
disabling an existing piece of software hosted by the first device; and
modifying a configuration of the first device to manage a threat to the first device.

11. The method of claim 1, wherein the first device is an orchestrator and the second device is an edge device.

12. A non-transitory machine-readable medium having instructions stored therein, which when executed by a processor, cause the processor to perform operations for managing devices of a deployment, the operations comprising:
providing, by a first device of the devices, a challenge to a second device of the devices;
obtaining, by the first device and via an optical channel, an encoded response to the challenge via an optical pulse train;
interpreting, by the first device, the optical pulse train using a ternary encoding system to obtain an interpreted response, the ternary encoding system defines a number system with three members and the optical pulse train comprises pulses of three magnitudes corresponding to respective members of the three members;
attempting, by the first device, to authenticate the interpreted response; and
in a first instance of the attempting where the interpreted response is authenticated:
establishing, by the first device, secure communications with the second device using the optical channel and a binary encoding system, wherein, prior to establishing the secure communications, the first device and the second device switch between communicating using first optical pulse trains encoded with the binary encoding system and second optical pulse trains encoded with the ternary encoding system on the optical channel.

13. The non-transitory machine-readable medium of claim 12, wherein the operations further comprise:
after sending the challenge and prior to obtaining the encoded response:
obtaining, by the first device and from the second device and via the optical channel, a first notification indicating switching from the binary encoding system to the ternary encoding system; and
providing, by the first device and to the second device and via the optical channel, a first acknowledgement to the first notification.

14. The non-transitory machine-readable medium of claim 13, wherein the operations further comprise:
in the first instance of the attempting and prior to establishing the secure communications:
providing, by the first device and to the second device and via the optical channel, a second notification indicating switching from the ternary encoding system to the binary encoding system; and
obtaining, by the first device and from the second device and via the optical channel, a second acknowledgement to the second notification.

15. The non-transitory machine-readable medium of claim 14, wherein the first notification and the first acknowledgement are carried over the optical channel using the first optical pulse trains encoded with the binary encoding system, and the second notification and the second acknowledgement are carried over the optical channel using the second optical pulse trains encoded with the ternary encoding system.

16. A first device, comprising:
a processor; and
a memory coupled to the processor to store instructions, which when executed by the processor, cause the processor to perform operations for managing devices of a deployment, the operations comprising:
providing, by the first device of the devices, a challenge to a second device of the devices;
obtaining, by the first device and via an optical channel, an encoded response to the challenge via an optical pulse train;
interpreting, by the first device, the optical pulse train using a ternary encoding system to obtain an interpreted response, the ternary encoding system defines a number system with three members and the optical pulse train comprises pulses of three magnitudes corresponding to respective members of the three members;
attempting, by the first device, to authenticate the interpreted response; and
in a first instance of the attempting where the interpreted response is authenticated:
establishing, by the first device, secure communications with the second device using the optical channel and a binary encoding system, wherein, prior to establishing the secure communications, the first device and the second device switch between communicating using first optical pulse trains encoded with the binary encoding system and second optical pulse trains encoded with the ternary encoding system on the optical channel.

17. The first device of claim 16, wherein the operations further comprise:
   after sending the challenge and prior to obtaining the encoded response:
      obtaining, by the first device and from the second device and via the optical channel, a first notification indicating switching from the binary encoding system to the ternary encoding system; and
      providing, by the first device and to the second device and via the optical channel, a first acknowledgement to the first notification.

18. The first device of claim 17, wherein the operations further comprise:
   in the first instance of the attempting and prior to establishing the secure communications:
      providing, by the first device and to the second device and via the optical channel, a second notification indicating switching from the ternary encoding system to the binary encoding system; and
      obtaining, by the first device and from the second device and via the optical channel, a second acknowledgement to the second notification.

19. The first device of claim 18, wherein the first notification and the first acknowledgement are carried over the optical channel using the first optical pulse trains encoded with the binary encoding system, and the second notification and the second acknowledgement are carried over the optical channel using the second optical pulse trains encoded with the ternary encoding system.

20. The first device of claim 16, wherein the binary encoding system defines a number system with two members.

* * * * *